June 28, 1966    E. KOCH ETAL    3,258,185
INTERNALLY COOLED WELDING DAM
Filed July 19, 1963
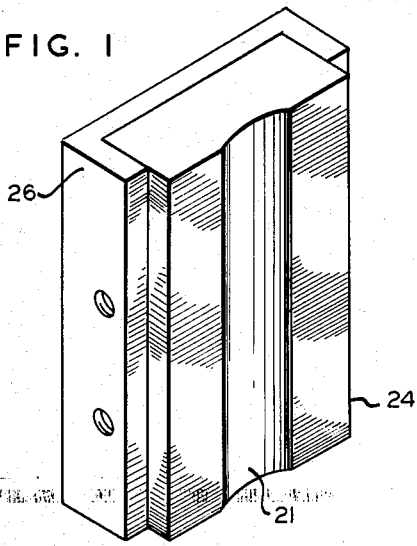
FIG. 1
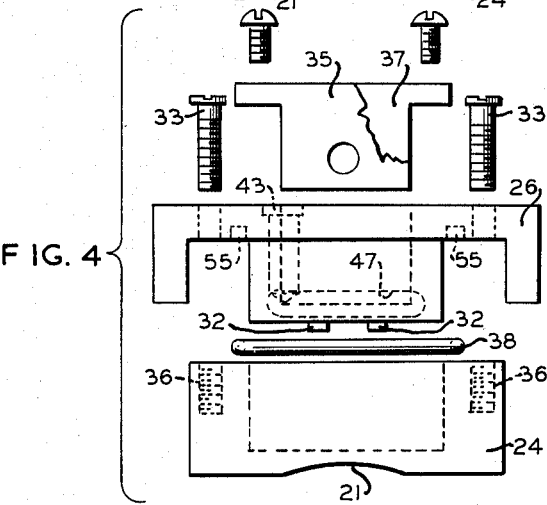
FIG. 2
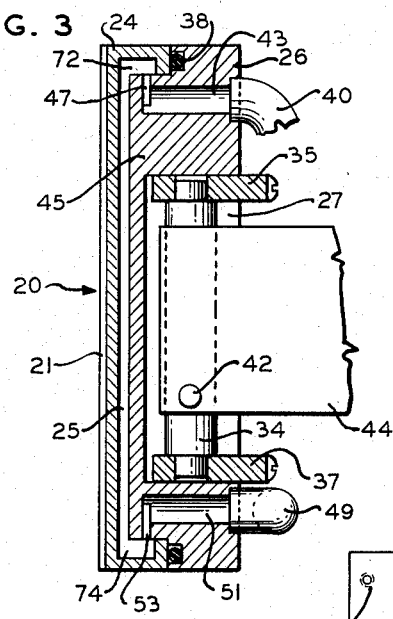
FIG. 3
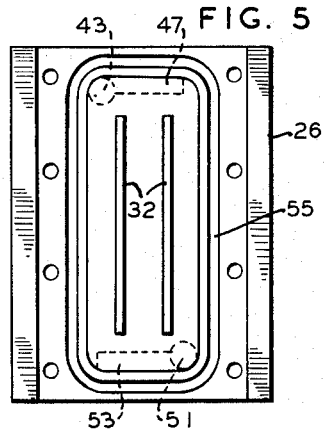
FIG. 4
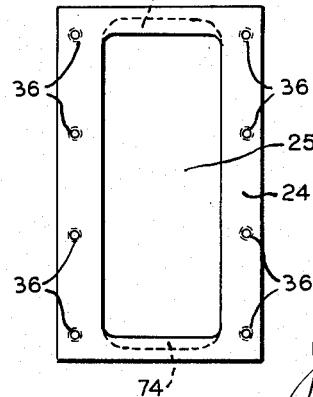
FIG. 6
FIG. 5
INVENTORS
EUGENE KOCH
FRANK G. FERRAIOLI
BY
John W. Gaines
ATTORNEY United States Patent Office
3,258,185
Patented June 28, 1966

3,258,185
INTERNALLY COOLED WELDING DAM
Eugene Koch, Maplewood, and Frank G. Ferraioli,
Berkeley Heights, N.J., assignors to Air Reduction
Company, Incorporated, New York, N.Y., a corporation of New York
Filed July 19, 1963, Ser. No. 296,347
8 Claims. (Cl. 228—50)

This invention relates to welding dams for confining and shaping welds especially in generally vertical seams, and more particularly to means for cooling such dams during use.

An object of the invention is to improve the efficiency of cooling of a welding dam during a welding operation.

Another object is to facilitate the manufacture and assembly of an internally cooled welding dam.

A further object is to avoid the necessity to discard a welding dam in its entirety when the bearing face has been worn or contaminated in use; by making the device in two parts, one of which, herein called a shoe, is relatively simple and cheap and receives the bulk of the wear and contamination and may be discarded, while the other more complex and costly portion, herein called a support member, may continued in use.

Accordingly, a feature of the invention is the formation of the welding dam in two parts, of which the shoe may be replaced or discarded while retaining the support member in service. The replaceable shoe portion may contain a shallow depression for molding the weld as it solidifies, in which case a plurality of shoes with different widths or shapes of depressions therein may be provided for interchangeable use. In operation, the depression is the only portion of the working surface of the shoe which is in contact with the weldment; the extremity of the working surface at both sides of the depression is spaced apart at all times from the weld and workpieces. A caster type spacing means is provided for the purpose of maintaining the space between about 1/32″ and 1/16″, and is more completely disclosed and claimed in copending Agnew, Koch, and Ferraioli Serial No. 296,335.

Another feature is the formation of a passageway for broad flow of coolant in a space between the shoe and the support member. The thickness of the passageway is an advantageous compromise between an exceedingly thin passageway that has the advantage of the fact that a slow moving layer of coolant close to the wall of the passageway which tends to retard heat transfer is substantially non-existent, and a materially thicker passageway that has the advantage that occasional explosion of the entire thickness of the coolant stream into vapor is substantially prevented. In other words, too thin a passageway has the disadvantage that it tends to cause explosion by overheating the coolant, while too thick a passageway has the disadvantage that the cooling effect is reduced.

Another feature is the use of thin metal ribs on one or both of the surfaces forming the coolant passageway to guard against collapse and obstruction of the passageway in case of overheating of the shoe.

A further feature is an O-ring seal between the shoe and the support member for sealing the passageway containing the coolant.

Another feature is a relatively thin wall between the coolant passageway and the face of the shoe in contact with the workpiece.

The coolant system disclosed herein has been found to be more uniform and more effective than systems employing cooling passages consisting only of drilled passages as commonly used heretofore. This principle of the invention in conjunction with the procedures hereof enables the following, shaping, and solidifying of a generally vertical weld between fairly thick workpieces, which is suitably accomplished by defining an outwardly bowed casting cavity by means of a welding dam shoe which is closely spaced apart at the extremity of its working surface from the workpieces; flowing a broad film of coolant in intimate heat exchange relation with the non-working surface of the shoe; and moving said shoe upwardly along the weld as the cast weld metal is being shaped and solidified.

Other features, objects and advantages will appear from the following more detailed description of an illustrative embodiment of the invention, which will now be given in conjunction with the accompanying drawings.

In the drawings,

FIGURE 1 is a perspective view of an internally cooled welding dam in accordance with the invention;

FIGURE 2 is a plan view, mainly in cross section, and showing one dam with its shoe, support member and mounting means, with the dam in operative relation to a weld and workpieces and showing the cooperative relation of a similar dam on the opposite side of the weld and workpieces;

FIGURE 3 is a vertical cross-sectional view of a shoe and support member as in FIGURE 2;

FIGURE 4 is an exploded top view corresponding generally to the plan view shown in FIGURE 2;

FIGURE 5 is a front elevational view of the support member shown in FIGURES 1–4;

FIGURE 6 is a rear elevational view of the shoe shown generally in FIGURES 1–4;

FIGURES 5 and 6 are on a reduced scale as compared to the preceding figures.

Referring to FIGURE 1, the shoe 24 of a welding dam is shown having a generally flat face to be pressed against one side of the workpieces to be welded in a generally vertical welding operation. In the otherwise flat face may be a shallow vertical depression 21 for molding the cast weld metal into a convex weld reinforcement as the dam is moved upward along the seam as the weld solidifies.

In the back of the shoe 24 (FIGURES 2 and 3) is a cavity 25 presenting a wide area toward the weld. This cavity is closed by a removable support member 26 having a protruding portion 45 so as to define a wide passage having an inlet and an outlet for flowing coolant in a broad sheet along the wide passage. The passage for the coolant is shown in cross section in FIGURES 2 and 3.

The support member 26 is shown formed with ribs 32 which serve as spacers between the shoe 24 and the support member 26. The spacing, as assured by the presence of the ribs 32, is particularly important for preventing collapse or obstruction of the passage for the coolant in case excessive heating of the shoe should cause warping thereof. Alternatively, the ribs 32 may be formed upon the shoe 24 instead of upon the support member 26 as shown.

FIGURE 2 shows a pair of opposing shoes 24 and 24′ in operative relation to a pair of workpieces to be welded. The workpieces comprise two plates 76 and 78 shown in cross-section and assumed to extend generally vertically. A top view of the weld is shown at 80, conforming generally to the shape of the space between opposed depressions 21 and 21′ in the respective shoes 24 and 24′. The arcuately convex portions of the weld 80 can be, if desired, ground off flush with the plane of the workpieces on each side of the workpieces. The support member 26 is shown connected to plates 44, 46 through a pivotal joint having a vertically extending pivot 34 and having a horizontally extending pivot 42. The pivotal joint and connections thereto are more particularly described and claimed in a copending application of Agnew, Koch, and Ferraioli, Serial No. 296,335.

FIGURES 2, 3 and 4 show how the members are assembled to enclose the passage for the coolant, and the inlet and outlet connections therefor. Machine screws 33 pass through clearance holes in support member 26 into threaded holes 36 in shoe 24. A resilient O-ring 38 is confined between the members 26 and 24 as shown, to seal the passage for the coolant. A coolant inlet or outlet tube 40 is shown connected to a drilled hole 43 in the support member 26. The hole 43 connects through a passage or slot 47 in the support member with the interior of the shoe 24. The second connection for the coolant is by way of a tube 49, drilled hole 51, and passage or slot 53 communicating with the interior of the shoe 24.

The support member 26 is shown in front elevation in FIGURE 5. The front face of this member is provided with a continuous groove 55 into which the O-ring 38 may be inserted prior to sealing the coolant chamber.

Referring to FIGURES 3 and 6, it will be seen that the shoe 24 contains a generally rectangular hollow cavity which extends at top and bottom to form undercut portions 72 and 74 which provide access for the coolant between the passages 47 and 53 in the support member 26 and the passage 25.

In the cooling of the welding dam, the coolant may enter, for example, through the tube 40, the hole 43, the slot 47 in the support member 26 and the undercut portion 72 of shoe 24 to the space 25 between the shoe 24 and the support member 26. In this space, the coolant absorbs heat through the thin wall of the shoe 24 and then passes by way of the undercut portion 74 of shoe 24 slot 53 in support member 26, and hole 51 in member 26 to exit by way of the tube 49. The combination of the thin wall of the shoe 24 and the broadness of the space 25 provides efficient cooling of the working surface of the shoe 24 across the full width of the weld 80 and substantially precludes the weld from heating any portion of the shoe to its melting temperature.

When it is desired to replace or discard the shoe 24, the screws 33 may be withdrawn, the shoe 24 removed and another substituted, using the same support member 26. In the embodiment shown in the drawing, eight screws 33 are employed. Worn shoes may be discarded and shoes with different widths or shapes of vertical depressions 22 may be substituted for one another according to the needs of the work.

While illustrative forms of apparatus and methods in accordance with the invention have been described and shown herein, it will be understood that numerous changes may be made without departing from the general principles and scope of the invention.

What is claimed is:

1. In vertical welding apparatus, in combination, an internally cooled welding dam comprising a first workpiece confronting part and a second support part, said first part having a recess therein occupying the majority of the workpiece confronting area of said part and defining a relatively thin walled portion for confining and shaping the weld metal, said second part having a protruding portion fitting and extending into said recess and defining together with said recessed thin walled portion of the first part a broad cavity to accommodate a broad flow of coolant, said parts being fastened together and sealed against leakage of coolant, and inlet and outlet connections for coolant connected to said cavity.

2. Apparatus according to claim 1, in which said first part is attached by readily removable fastenings for removal and substitution.

3. Apparatus according to claim 1, in which one of said parts is provided with ribs extending into said cavity whereby distortion of said parts is substantially prevented from collapsing or blocking said cavity.

4. Apparatus according to claim 1, in which the means for sealing said cavity comprises an O-ring.

5. In a welding dam, in combination, a shoe for confining weld metal during solidification thereof in a generally vertical seam, and a supporting member for said shoe substantially coextensive in area with the shoe; said shoe having a recess therein occupying the majority of the workpiece confronting area of said shoe and defining a relatively thin walled portion for confining the weld metal, said supporting member having a protruding portion fitting and extending into said recess and defining together with said recessed thin walled portion of the said shoe a relatively long, broad, shallow cavity occupying the majority of the width of said shoe crosswise of the seam and the majority of the length of said shoe in the direction of the seam, the said defined cavity being shallow relatively to its breadth by a factor of several times; and means to pass a moving film of coolant through said cavity while substantially filling the same, the thickness of said cavity being small enough to substantially prevent the formation of a relatively slow moving layer of coolant close to the wall of the cavity and large enough to substantially prevent explosion into vapor of the coolant in the cavity while cooling the weld metal.

6. Apparatus according to claim 5, in which one of the pair of members comprising said shoe and said supporting member is provided with ribs extending into said cavity substantially from the one to the other of said pair of members and running in the general direction of the length of the cavity parallel to the seam during the welding operation, whereby distortion of the said shoe or of the said supporting member is substantially prevented from collapsing or blocking said cavity.

7. Apparatus according to claim 6, in which the said ribs are substantially parallel to one another and the said means to pass a moving film of coolant through said cavity is arranged to pass a plurality of substantially parallel films of coolant separated and maintained in parallel relationship by said ribs.

8. Apparatus according to claim 5, in which said shoe and said supporting member are fastened together by readily detachable means for replacement of said shoe by another shoe interchangeable therewith.

References Cited by the Examiner

UNITED STATES PATENTS

| | | | |
|---|---|---|---|
| 2,395,723 | 2/1946 | Chmielewski | 219—126 |
| 2,794,901 | 6/1957 | Christensen et al. | 219—126 |
| 3,024,352 | 3/1962 | Danhier | 219—126 |

FOREIGN PATENTS 456,704  11/1936  Great Britain.

JOHN F. CAMPBELL, *Primary Examiner.*

WHITMORE A. WILTZ, *Examiner.*

M. L. FAIGUS, *Assistant Examiner.*